United States Patent [19]

Walsh, IV et al.

[11] 4,378,273

[45] Mar. 29, 1983

[54] PROCESS FOR PRODUCING CHEMICAL PUMP ABSORBENTS FOR CHEMICAL LASERS

[75] Inventors: Raymond F. Walsh, IV, Canoga Park; Allan W. Lakin, Northridge, both of Calif.

[73] Assignee: Rockwell International Corporation, El Segundo, Calif.

[21] Appl. No.: 346,663

[22] Filed: Feb. 8, 1982

[51] Int. Cl.³ .......................... C25D 3/00; C25D 3/66
[52] U.S. Cl. .................................... 204/14 N; 204/39
[58] Field of Search ...................... 204/14 N, 39, 35 R

[56] References Cited

U.S. PATENT DOCUMENTS 3,953,234  4/1976  Hoffmann .................... 204/14 N
3,953,302  4/1976  Rao ............................. 204/14 N

*Primary Examiner*—T. M. Tufariello
*Attorney, Agent, or Firm*—H. Fredrick Hamann; Harry B. Field

[57] ABSTRACT

A process for the preparation of chemical pump absorbents comprises electrodeposition of an alkali or alkaline earth metal from a non-aqueous electrolyte. Calcium is preferred. The electrolyte comprises a polar, non-protonic solvent or is a fused salt electrolyte. The cathode substrate and electrodeposition parameters provide sufficient contact area and porosity to remove reactive species from laser effluent gas. Formation of a mercury amalgam followed by distillation of the mercury provides another suitable absorbent.

23 Claims, No Drawings

PROCESS FOR PRODUCING CHEMICAL PUMP ABSORBENTS FOR CHEMICAL LASERS

BACKGROUND OF THE INVENTION

Chemical pump absorbents are used to absorb laser effluent gases of chemical lasers. Among the molecular species present in the effluent gases are $H_2$, $N_2$, $D_2$, HF and DF.

A particularly useful absorbent for laser effluent gases is a reactive metal such as calcium. The efficiency of calcium or other reactive metal as an absorbent is typically proportional to the surface area available for contact with the exhaust gases.

U.S. Pat. No. 4,090,979 to Ogren et al discloses a method for increasing the surface area of reactive metals, including calcium, that are capable of dissolving in anhydrous liquid ammonia at cryogenic temperatures. The product of this process is a metal precipitate having a very fine particle size.

Powders produced by the Ogren et al process can be pressed onto a screen or other suitable substrate to increase contact area.

The above-described process requires cryogenic temperatures to produce the precipitate and additional processing steps to maximize contact area. For these reasons, the product of such a process is relatively expensive.

SUMMARY OF THE INVENTION

According to the present invention, there is provided a process for the production of chemical pump absorbents for chemical lasers.

The process comprises electrolytic deposition of an alkali metal or alkaline earth metal onto a suitable conductive matrix from a substantially non-aqueous electrolyte containing at least one salt of an alkali or alkaline earth metal.

In a first embodiment according to the principles of the invention, the alkali or alkaline earth metal is electrolytically deposited from an electrolytic bath containing at least one salt of an alkali or alkaline earth metal contained in a substantially non-aqueous, polar, non-protonic solvent. The presently preferred salts are calcium salts at a concentration of about 1 molar. The alkaline or alkali earth metal is deposited as a thin film onto a conductive matrix (cathode).

The geometry or shape of the cathode varies according to space requirements of the laser system. A preferred geometry is that of a porous absorbent sheet by which the effluent gas must pass. The cathode substrate for such a sheet has sufficient porosity to enable the effluent gas to pass into the substrate without creating a deleterious amount of pressure drop and a sufficiently large surface area to provide a reactive metal, deposited on such a substrate, with sufficient contact area to effectively remove substantially all of the reactive gaseous species from the effluent. Cathode substrates such as metal screens, metal sponges, open weave metal pads and the like are suitable.

The electrodeposition parameters including the salt concentration in the electrolyte, the temperature of the electrolyte and the current density vary according to the salt-solvent system employed. The parameters are selected to produce a coherent porous deposit of high surface area. The preferred metal is calcium.

A second embodiment of the invention comprises electrodeposition of a thin alkali or alkaline earth metal film onto a conductive matrix (cathode) such as a metal screen from a fused salt electrolytic bath comprising of at least one salt of the alkali or alkaline earth metal. Again, the preferred salts are calcium salts.

The optimum electrodeposition conditions depend on the salt or salts selected and are chosen to give a coherent deposit, perferably maximizing the surface area.

A third embodiment of the invention comprises electrodeposition of the alkali or alkaline earth metal from a non-aqueous electrolytic bath containing at least one salt of the alkali or alkaline earth metal onto a mercury cathode. This produces an amalgam containing mercury and an alkali or alkaline earth metal. Following formation of the amalgam, the amalgam is worked into a desired shape. The mercury is then removed by vacuum distillation to produce a porous alkali or alkaline earth metal structure having the desired shape.

DETAILED DESCRIPTION

In accordance with the present invention, there is provided a process for the production of chemical pump absorbents for removing reactive species from chemical laser effluent gas. The absorbents comprise an alkali and alkaline earth metal.

As used herein, "reactive species" refers to the gaseous products present in laser effluent gas that are reactive to a reactive metal and include the molecular species $H_2$, $N_2$, $D_2$, HF and DF.

As used herein, "alkali and alkaline earth metal" refers to Group Ia and IIa metals and include lithium, sodium, potassium, cesium, magnesium, calcium, barium, mixtures thereof and the like. Calcium is preferred.

The process comprises electrolytic deposition of an alkali metal or alkaline earth metal onto a suitable conductive matrix from a non-aqueous electrodeposition bath containing at least one salt of an alkali or alkaline earth metal wherein the deposit form is of high surface area per unit mass to maximize functionality as an absorbent medium.

In one embodiment of the invention, a thin alkali or alkaline earth metal film is electrolytically deposited onto a suitable conductive matrix from an electrolytic bath containing at least one salt of an alkali or alkaline earth metal and a non-aqueous, polar, non-protonic solvent. The solvent is polar to enable the alkali or alkaline earth salt to dissolve in the solvent. The solvent is non-aqueous and non-protonic to prevent reaction with the reactive alkali or alkaline earth metal once it has been deposited. Utile solvents include pyridene, N,N-dimethylformamide, formamide, acetamide, propylene carbonate, mixtures thereof and the like.

The presently preferred salts are calcium salts. Calcium is the preferred metal for electrodeposition because it demonstrates the most preferred combination of reactivity and stability, i.e., it is sufficiently reactive to react with and thereby eliminate the gaseous products from laser pumps, yet has sufficiently stable reaction products. Particularly preferred calcium salts to form a calcium deposit include calcium chloride, calcium chlorate, calcium nitrate, mixtures thereof and the like which are preferably present in a concentration of about 1 molar.

The alkaline or alkali earth metal is deposited onto a conductive matrix (cathode) forming a suitable substrate. The material selected for use as a cathode is capable of forming a cohesive bond with the deposited metal and as a minimum must enable entrainment of the deposit. In addition, the material must be impervious to reaction with the electrolyte and resistant to passivation and to the formation of intervening organic films on its surface, thereby preventing the formation of metal-metal bonds or coating.

The geometry or shape of the cathode varies according to space requirements of the laser system. A preferred geometry is that of a porous absorbent sheet by which the effluent gas must pass. The cathode substrate for such a sheet has sufficient porosity to enable the effluent gas to enter or permeate the substrate without creating a deleterious pressure drop and a sufficiently large surface area to provide a reactive metal, deposited on such a substrate, with sufficient contact area to effectively remove substantially all of the reactive gaseous species from the effluent. Typical of such cathode substrates are metal screens, metal sponges, open weave metal pads and the like.

The anode may be active or passive. Passive anodes are constructed of a conductive material resistant to attack by the electrolyte. Preferred materials include graphite and platinum. The most preferred anodes are made of the same metal as that being deposited on the cathode and are active, i.e., electrolytically dissolve into solution at a rate that maintains solution composition.

The concentration of salt and the optimum plating conditions, including temperature and current density vary according to which salt and solvent are used. The conditions are selected to produce a finely-divided coherent deposit having maximum surface area at minimum cost. A thin deposit is preferred.

Suitable electrodeposition parameters for a particular solvent and salt combination can be readily determined by conventional means, such as Hull cell analysis. A Hull cell is a trapezoidal cell having an anode end perpendicular to two parallel sides. A cathode, typically a metal panel adjacent to the cathode end of the cell, is at an angle to an anode adjacent to the anode end, one side of the cathode being a greater distance from the anode than the other side of the cathode.

A sample of the electrodeposition bath is introduced into the cell and current is passed between the cathode and anode causing the metal ions of the bath to deposit onto the cathode. The cell design provides that the portion of the cathode nearest the anode simulates extreme high current density deposition whereas the portion of the cathode furthest from the anode simulates extreme low current density deposition. Actual current density at any position on the cathode is readily ascertainable from the total current passing through the cell.

Examination of the cathode after electrodeposition of the desired metal for a select time reveals the current density range most suitable for the particular solvent-salt electrolyte for producing a coherent deposit. Typically high current densities are preferred because dendritic structures are formed at high current densities which display a large surface area.

Mechanical agitation such as rocking or vertical agitation is also simulated in the Hull cell, e.g., by movement of a rod close to the cathode. Mechanical agitation is presently preferred as it maintains uniform electrolyte concentrations and helps to prevent "barns", i.e., granular non-coherent deposits resulting from high current deposition.

A second embodiment of the invention comprises electrodeposition of an alkali or alkaline earth metal conductive matrix onto a cathode such as a metal screen from a fused salt electrolyte comprising at least one salt of an alkali or alkaline earth metal. The preferred salts are calcium salts and particularly preferred salts are selected from the group consisting of calcium chloride, calcium chlorate, calcium fluoride, calcium oxide, mixtures thereof and the like.

In this embodiment, the anode and cathode are constructed from materials compatible, e.g., able to withstand the fused salt temperatures, with the fused salt electrolyte. The presently preferred cathode is made of metals such as steel and the like. It is presently preferred to use an active anode made of the same reactive metal that is being deposited. Passive anodes such as graphite and platinum are also useful. The optimum current density and temperature of the electrolytic bath is dependent upon the salt or salts selected and is chosen to give a finely granular coherent deposit. Electrodeposition parameters may be determined for a particular system using Hull cell tests.

A third embodiment according to principles of the invention comprises electrodeposition of an alkali or alkaline earth metal onto a mercury cathode from a non-aqueous electrolytic bath containing at least one salt of an alkali or alkaline earth metal. This produces a mercury-alkali metal or mercury-alkaline earth metal amalgam.

It is preferred that the electrodeposited metal is calcium and particularly preferred that calcium salts in the electrolyte be selected from the group consisting of calcium chloride, calcium chlorate, calcium nitrate and mixtures thereof and are present in the electrolyte in a concentration of about 1 molar.

Solvents are selected from non-aqueous, polar, non-protonic salts and the preferred solvents include pyridene, N,N-dimethylformamide, formamide, acetamide, propylene carbonate, mixtures thereof and the like.

Electrodeposition occurs onto a pool of mercury. It is presently preferred that the amount of mercury in the amalgam not exceed 78 percent and more preferably be within the range of from about 30 percent to about 70 percent. The porosity of the resulting reactive metal structure is dependent upon the composition of the amalgam. Amalgams having little mercury result in structures having low porosity and increased difficulty in removal of the mercury. Amalgams having a large percentage of Hg result in structures having poor structural stability. The preferred amalgam, then, is one that results in a reactive metal structure having sufficient porosity, and hence sufficient contact area, to remove substantially all of the reactive species present in the effluent gas and is also structurally stable.

Electrodeposition parameters for a particular salt-solvent system can, again, be readily optimized by Hull cell analysis using a cell modified for use with a liquid cathode. A typical modification comprises orienting the Hull cell so that the cathode (pool or mercury) lies below the anode in a generally horizontal plane. The pool of mercury is divided into a plurality of compartments to provide a plurality of amalgams, the composition of each amalgam reflecting the average current density of that compartment.

Following formation of the amalgam, the amalgam is worked or formed into a desired shape such as a plate, screen or the like. The mercury is then removed by vacuum distillation. This yields a porous alkali or alkaline earth metal absorbent having a desired shape and an internal structure similar to a sintered metal, thereby providing a large surface area.

It is to be understood that what has been described is merely illustrative of the principles of the invention and that numerous arrangements in accordance with this invention may be devised by one skilled in the art without departing from the spirit and scope thereof.

What is claimed is:

1. A process for the preparation of a chemical pump absorbent for removing reactive species from chemical laser effluent gas comprising:
   a. forming a non-aqueous electrolytic bath comprising at least one metal salt selected from the group consisting of alkali metal salts, alkaline earth metal salts and mixtures thereof; and
   b. electrodepositing onto a conductive matrix metal from the electrolytic bath to thereby form a structure reactive to the reactive species in the laser effluent gas and having sufficient porosity to enable laser effluent gas to enter and sufficient surface area to react with and remove substantially all of the reactive species from the laser effluent gas.

2. A process as claimed in claim 1 wherein the electrolytic bath comprises at least one calcium salt and a non-aqueous, polar, non-protonic solvent.

3. A process as claimed in claim 2 wherein the electrolytic bath comprises at least one calcium salt at a concentration of about 1 M.

4. A process as claimed in claim 2 wherein the electrolytic bath comprises a calcium salt selected from the group consisting of calcium chloride, calcium chlorate, calcium nitrate and mixtures thereof.

5. A process as claimed in claim 1 wherein the electrolytic bath comprises a solvent selected from the group consisting of pyridene, N,N-dimethylformamide, formamide, acetamide, propylene carbonate and mixtures thereof.

6. A process as claimed in claim 1 wherein the electrolytic bath is a fused salt electrolyte.

7. A process for the preparation of a chemical pump absorbent for removing reactive species from chemical laser effluent gas comprising:
   a. forming a non-aqueous electrolytic bath comprising at least one calcium salt and a solvent selected from the group consisting of pyridene, N,N-dimethylformamide, formamide, acetamide, propylene carbonate and mixtures thereof; and
   b. electrodepositing calcium metal from the electrolytic bath onto a conductive matrix to thereby form a structure reactive to the reactive species in the laser effluent gas having sufficient porosity to enable laser effluent gas to enter and sufficient surface area to react with and remove substantially all of the reactive species from the laser effluent gas.

8. A process as claimed in claim 7 wherein the electrolytic bath comprises a calcium salt selected from the group consisting of calcium chloride, calcium chlorate, calcium nitrate and mixtures thereof.

9. A process as claimed in claim 7 wherein the electrolytic bath comprises at least one calcium salt at a concentration of about 1 M.

10. A process for the preparation of a chemical pump absorbent for removing reactive species from chemical laser effluent gas comprising:
    a. forming an electrolytic bath comprising a calcium salt selected from the group consisting of calcium chloride, calcium chlorate, calcium nitrate and mixtures thereof, in a concentration of about 1 M and a non-aqueous, polar, non-protonic solvent selected from the group consisting of pyridene, N,N-dimethylformamide, formamide, acetamide, propylene carbonate and mixtures thereof; and
    b. electrodepositing calcium metal from the electrolytic bath onto a conductive matrix to thereby form a structure reactive to the reactive species in the laser effluent gas having sufficient porosity to enable laser effluent gas to enter and sufficient surface area to react with and remove substantially all of the reactive species from the laser effluent gas.

11. A process for the preparation of a chemical pump absorbent for removing reactive species from chemical laser effluent gas comprising:
    a. forming a fused salt electrolyte comprising at least one metal salt selected from the group consisting of salts of alkali metals, salts of alkaline earth metals and mixtures thereof; and
    b. electrodepositing metal onto a conductive matrix from the fused salt electrolyte to thereby form a structure reactive to the reactive species in the laser effluent gas having sufficient porosity to enable laser effluent gas to enter and sufficient surface area to react with and remove substantially all of the reactive species from the laser effluent gas.

12. A process as claimed in claim 11 wherein the fused salt electrolyte comprises at least one calcium salt.

13. A process as claimed in claim 12 wherein the fused salt electrolyte comprises a calcium salt selected from the group consisting of calcium chloride, calcium chlorate, calcium fluoride and mixtures thereof.

14. A process for the preparation of a chemical pump absorbent for removing reactive species from chemical laser effluent gas comprising:
    a. forming a non-aqueous electrolytic bath comprising at least one metal salt selected from the group consisting of alkali metal salts, alkaline earth metal salts and mixtures thereof;
    b. electrodepositing from the electrolytic bath an alkali or alkaline earth metal onto a mercury cathode to thereby produce an amalgam containing mercury and an alkali metal or alkaline earth metal; and
    c. removing the mercury by vacuum distillation to thereby form a structure reactive to the reactive species in the laser effluent gas having sufficient porosity to enable laser effluent gas to enter and sufficient surface area to react with and remove substantially all of the reactive species from the laser effluent gas.

15. A process as claimed in claim 14 in which the amalgam is formed into a desired shape prior to removing the mercury from the amalgam by vacuum distillation.

16. A process as claimed in claim 14 wherein the electrolytic bath comprises at least one calcium salt.

17. A process as claimed in claim 16 wherein the electrolytic bath comprises at least one calcium salt at a concentration of about 1 M.

18. A process as claimed in claim 16 wherein the electrolytic bath comprises a calcium salt selected from the group consisting of calcium chloride, calcium chlorate, calcium nitrate and mixtures thereof.

19. A process as claimed in claim 14 wherein the electrolytic bath comprises a solvent selected from the group consisting of pyridene, N,N-dimethylformamide, formamide, acetamide, propylene carbonate and mixtures thereof.

20. A process for the preparation of a chemical pump absorbent for removing reactive species from chemical laser effluent gas comprising:
  a. forming an electrolytic bath comprising at least one calcium salt and a solvent selected from the group consisting of pyridene, N,N-dimethylformamide, formamide, acetamide, propylene carbonate and mixtures thereof;
  b. electrodepositing calcium from the electrolytic bath onto a mercury cathode to thereby produce a calcium-mercury amalgam;
  c. forming the amalgam into a desired filter shape; and
  d. removing the mercury by vacuum distillation to thereby form a structure reactive to the reactive species in the laser effluent gas having sufficient porosity to enable laser effluent gas to enter and sufficient surface area to react with and remove substantially all of the reactive species from the laser effluent gas.

21. A process as claimed in claim 20 wherein the electrolytic bath comprises a calcium salt selected from the group consisting of calcium chloride, calcium chlorate, calcium nitrate and mixtures thereof.

22. A process as claimed in claim 20 wherein the electrolytic bath comprises at least one calcium salt at a concentration of about 1 M.

23. A process for the preparation of a chemical pump absorbent for removing reactive species from chemical laser effluent gas comprising:
  a. forming an electrolytic bath comprising a calcium salt selected from the group consisting of calcium chloride, calcium chlorate, calcium nitrate and mixtures thereof, in a concentration of about 1 M and a solvent selected from the group consisting of pyridene, N,N-dimethylformamide, formamide, acetamide, propylene carbonate and mixtures thereof;
  b. electrodepositing calcium from the electrolytic bath onto a mercury cathode to thereby produce a calcium-mercury amalgam;
  c. forming the amalgam into a desired shape; and
  d. removing the mercury by vacuum distillation to thereby form a structure reactive to the reactive species in the laser effluent gas having sufficient porosity to enable laser effluent gas to enter and sufficient surface area to react with and remove substantially all of the reactive species from the laser effluent gas.

* * * * *